United States Patent [19]
Terasawa

[11] Patent Number: 5,428,406
[45] Date of Patent: Jun. 27, 1995

[54] IMAGE DISPLAY DEVICE
[75] Inventor: Hideo Terasawa, Kangawa, Japan
[73] Assignee: Sony Corporation, Tokyo, Japan
[21] Appl. No.: 152,092
[22] Filed: Nov. 15, 1993
[30] Foreign Application Priority Data
Nov. 21, 1992 [JP] Japan .................. 4-335324
[51] Int. Cl.⁶ .............................................. H04N 5/44
[52] U.S. Cl. ..................... 348/734; 345/157;
345/161; 455/151.1
[58] Field of Search ............... 348/734, 731, 732, 725,
348/564, 565, 566; H04N 5/44, 5/445, 5/45;
345/157, 158, 160, 161, 163, 164, 167;
455/151.1, 153.1

[56] References Cited
U.S. PATENT DOCUMENTS

| 4,746,983 | 5/1988 | Hakamada | 348/565 |
| 4,910,503 | 3/1990 | Brodsky | 345/161 |
| 4,998,171 | 3/1991 | Kim et al. | 348/565 |

FOREIGN PATENT DOCUMENTS

| 59-33539 | 2/1984 | Japan | 345/161 |
| 4182697 | 6/1992 | Japan | 345/161 |

Primary Examiner—James J. Groody
Assistant Examiner—Michael H. Lee
Attorney, Agent, or Firm—Jay H. Maioli

[57] ABSTRACT

A device for controlling the display of an image on a display screen with which a desired channel image can be selected with ease in which an operating member set on its one end is normally held upright at a predetermined position and is swingable from the predetermined position in the range of a predetermined angle, so that an image to be displayed on the display screen is selected from among a plurality of reproducible images according to the direction of operation of the operating member. Hence, with the image display device, selection of a desired channel can be achieved with ease.

9 Claims, 10 Drawing Sheets

| PROGRAM No. | BAND | CHANNEL | TV BROADCASTING STATION |
|---|---|---|---|
| 0 | VHF | 1 | A |
| 1 | VHF | 3 | B |
| 2 | VHF | 4 | C |
| 3 | VHF | 6 | D |
| 4 | VHF | 8 | E |
| 5 | VHF | 10 | F |
| 6 | VHF | 12 | G |
| 7 | UHF | 42 | H |
| 8 | UHF | 46 | I |
| 9 | UHF | 38 | J |
| 10 | UHF | 48 | K |
| 11 | BS | 7 | L |
| 12 | BS | 11 | M |
| 13 | BS | 5 | N |
| ⋮ | ⋮ | ⋮ | ⋮ |
| 19 | CS | 7 | T |

… 
IMAGE DISPLAY DEVICE

BACKGROUND OF THE INVENTION

FIELD OF THE INVENTION

This invention relates to an image display device that is particularly is suitable, for example, for the selection of an image to be displayed on a television set.

DESCRIPTION OF THE RELATED ART

Heretofore, there are available a variety of methods for controlling the display of a desired channel image on the display screen of a television set.

The first of the conventional methods is a dial rotation type channel selecting method in which a predetermined dial type operating piece provided in a channel operating section is turned, so that a channel is shown in correspondence to the angular position of the dial type operating piece.

The second of the conventional methods is the direct button method in which a plurality of selecting buttons are provided for channels, respectively, and a desired channel is selected by depressing the corresponding button.

In the third method, a plus key and a minus key are provided in the channel operating section, and they are electively operated to select a desired channel.

In the fourth method, a rotary jog dial is provided, so that a channel is switched to another by operating the rotary jog dial stepwise.

In the fifth method, as many sub-pictures as channels are provided in the display screen (for instance sixteen sub-pictures are provided), and one of the sub-pictures is pointed out with the cursor to select a desired channel.

In the dial rotation type channel selecting method, a contact provided on the side of the dial is brought into contact with one of the contacts which are assigned respectively to the channels on the side of the device, to select one of the channels. Therefore, the method involves a problem that the channels are limited in number. In addition, the method is disadvantageous in that, since the contacts are mechanically brought into contact with each other for selection of a desired one of the channels, the contacts are liable to be worn out soon; that is, they are low in durability.

The direct button method suffers from the following difficulties: The number of channels is limited by the number of buttons. That is, in order to increase the number of channels, it is necessary to increase the number of buttons, and accordingly to increase the volume of the device. Thus, the resultant device is unavoidably intricate in operation.

In the third method of using the plus key and the minus key, the desired channel often cannot be reached without operating the keys many times. This key operation is rather troublesome.

The fourth method of using the jog dial is disadvantageous in that the operator cannot know intuitively when the desired channel has been selected, because the operation of the jog dial does not correspond to the appearance of the channel images which are displayed on the screen as the jog dial is operated.

The fifth method of providing the sub-pictures in the display screen is also disadvantageous in the following points: Placement of the sub-pictures over the whole area of the display screen overwhelms the operator. Moreover, because video signals are assigned to the sub-pictures through one signal receiving circuit, images are intermittently displayed on the sub-pictures.

SUMMARY OF THE INVENTION

In view of the foregoing, an object of this invention is to provide an image display device in which a desired channel image can be selected with ease.

The foregoing object and other objects of the invention have been achieved by the provision of an image display device which comprises an operating member 5 set on its one end at the origin, which is the intersection of the x-axis and the y-axis of an x-y plane, the operating member 5 being normally held upright along the z-axis perpendicular to the x-y plane, and being swingable from the position where it is held upright within a range of a predetermined angle $\theta$ with respect to the z-axis; operating position detecting means 11 for detecting the amounts of displacement of the operating member 5 from the position where it is held upright respectively in the directions of the x-axis, y-axis and z-axis; and selecting means 21, 25, 26, 32 and 33 for selecting, according to the results S2 and S3 of detection provided by the operating position detecting means 11, an image which is to be displayed on a display screen from among a plurality of reproducible images.

In the image display device, the operating member 5 and the operating position detecting means 11 are provided on a remote controller adapted to transmit a control signal S1 by wire or wireless signal transmission.

In the image display device, the operating member 5 has a recess 8A which is touched with the finger tip, indicating a direction in which said operating member 5 is operated.

The image display device further comprises: variable position display means 27 and 28 for displaying the image selected by said selecting means 21, 25, 26, 32 and 33 on the display screen 4 at a position which is determined from the result S2 of detection provided by the operating position detecting means 11.

The image display device further comprises: television signal receiving circuits 23 and 24 for reproducing the image of a receive channel selected from among a plurality of television broadcasting receive channels, the selecting means specifying a receive channel, the image of which is to be displayed on said display screen, for said television signal receiving circuits.

In the image display device, the selecting means 21, 25, 26, 32 and 33 specifies a receive channel according to a relative angle of rotation of the recess 8A around the z-axis.

In the image display device, the selecting means 21, 25, 26, 32 and 33 specifies a receive channel according to an absolute direction of operation of the recess 8A.

In the image display device, the selecting means 21, 25, 26, 32 and 33 operates to contract the image of the receive channel thus specified, and to display the image thus contracted on the sub-picture in the display screen 4.

In the image display device further comprises: a first television signal receiving circuit 23 for displaying the image of the receive channel which has been selected from among a plurality of television broadcasting receive channels, on the main screen 50 in said display screen 4; and a second television signal receiving circuit 24 for contracting the image of the receive channel specified by the selecting means 21, 25, 26, 32 and 33 and displaying the image thus contracted on the sub-screen 51 in the display screen 4 in an image superposition mode.

In the image display device, the operating member 5 is supported on its one end in such a manner that it is returned to the predetermined position where it is held upright, and swingable in the range of a predetermined angle $\theta$ from the predetermined position. With the image display device, an image to be displayed is selected from among a plurality of reproducible images according to the direction of operation of the operating member 5 whereby a desired channel is readily selected from among a number of channels.

The operating member 5 and the operating position detecting means 11 are provided on the remote controller 2 adapted to transmit the control signal S1 by wire or wireless signal transmission, which makes it possible to reduce the number of operating elements on the remote controller 2; that is, to miniaturize the latter 2. Thus, the resultant remote controller 2 can be operated readily.

Furthermore, in the image display device, the variable position display means 27 and 28 are provided which are adapted to display the image, which has been selected by the selecting means 21, 25, 26, 32 and 33, on the display screen at the position which corresponds to the result S2 of detection provided by the operating position detecting means 11, and the reproduced image of the receive channel specified by the selecting means 21, 25, 26, 32 and 33 is contracted to be displayed on the sub-picture 51 at a desired position. Hence, the channel selection can be achieved by referring to the image displayed on the sub-picture 51 at the desired position.

According to the present invention, in the image display device of the invention, the operating member if provided in such a manner that it is supported on its one end at the origin, which is the intersection of the x-axis and the y-axis of the x-y plane, and the operating member is normally held upright along the z-axis perpendicular to the x-y plane, and is swingable from the position where it is held upright in the range of the predetermined angle with respect to the z-axis, so that an image to be displayed on the display screen is selected from among a plurality of reproducible images according to the direction of operation of the operating member. Hence, with the image display device, a desired channel can be detected with ease.

In the image display device, the operating member is provided on the remote controller adapted to transmit the predetermined control signal by wire or wireless signal transmission, which makes it possible to miniaturize the remote controller. The resultant remote controller can be operated readily.

With the image display device, the channels are selected one after another according to the relative angles of rotation of the recess of the operating piece around the z-axis. This eliminates the difficulty that exists where the number of channels which can be selected with the operating piece is limited. Thus, an image display device can be constructed according to the invention which can be effectively used in the age of multi-channel television.

Furthermore, since the receive channels can be specified according to the absolute directions of operation of the recess around the z-axis, the operator can detect the desired receive channel directly.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Preferred embodiments of this invention will be described with reference to the accompanying drawings:

(1) Arrangement of the Operating Section

Figure 1:
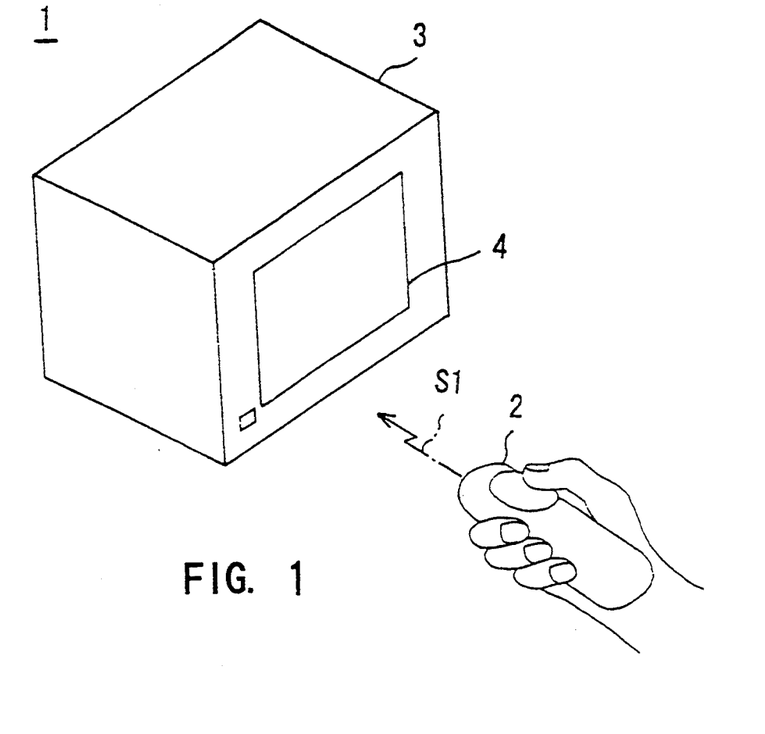
FIG. 1 is perspective view showing one example of an image display device according to this invention.

In FIG. 1, reference numeral 1 generally designates a television set 3. A desired image is displayed on the display screen 4 of the television set 3 in response to a control signal S1 from a remote controller 2.

Figure 2:
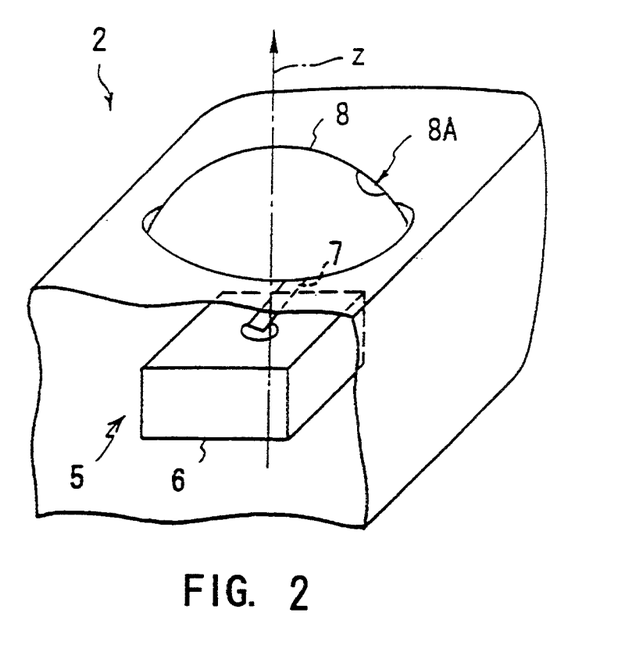
FIG. 2 is a perspective view, with parts cut away, showing a remote controller in the image display device.

As shown in FIG. 2, a joy stick type controller 5 is built in the remote controller 2.

The controller 5 comprises a base 6, and a bar-shaped member 7. The bar-shaped member 7 is supported on the base 6 in such a manner that it is rotatable around the z-axis while being inclined at a particular angle to the z-axis, and is impelled to return to the z-axis so as to be oriented along the z-axis.

Figure 3A:
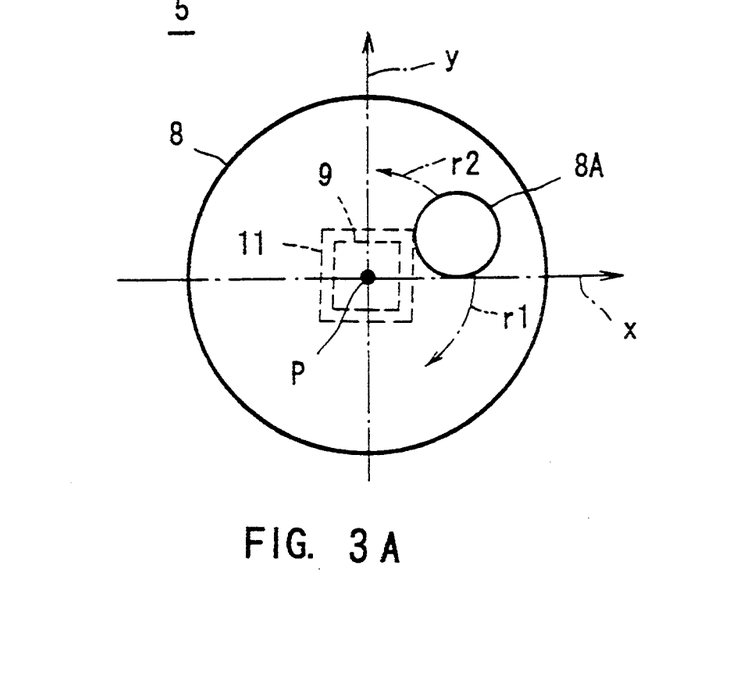
FIGS. 3A and 3B are explanatory diagrams for a description of the operation of an operating position detecting section for an operating piece.
Figure 3B:
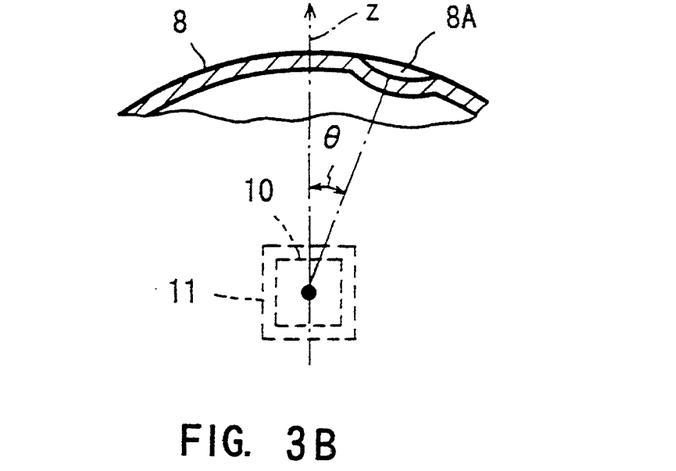

An operating piece 8, which is substantially semi-spherical, is connected to the outer end other end of the bar-shaped member 7 in such a manner that it appears partially in the surface of the remote controller 2. A dimple-shaped recess 8A, which is substantially semi-spherical, is formed in the surface of the operating piece 8 on the prolongation of the bar-shaped member 7 (hereinafter referred to as "the dimple 8A", when applicable). The operating piece 8 is designed as follows: As shown in FIGS. 3A and 3B, the dimple 8A is rotatable around the z-axis in a conical range causing the bar-shaped member 7 to form a particular angle $\theta$ with the z-axis, and is normally returned to the central position P.

That is, the operator can move the operating piece 8 in a desired direction by moving the dimple 8A with the finger.

The base 6 has an operating position detecting section 11 as shown in FIGS. 3A and 3B, which comprises: a direction detecting section 9 for detecting the direction of inclination of the bar-shaped member 7 in the x-y coordinate system; and an inclination detecting section 10 for detecting an inclination 8 of the bar-shaped member 7 from the z-axis. That is, the operating position detecting section 11 detects whether or not the dimple 8A is inclined from the central position P, and the direction in which the dimple 8A is inclined.

Figure 4:
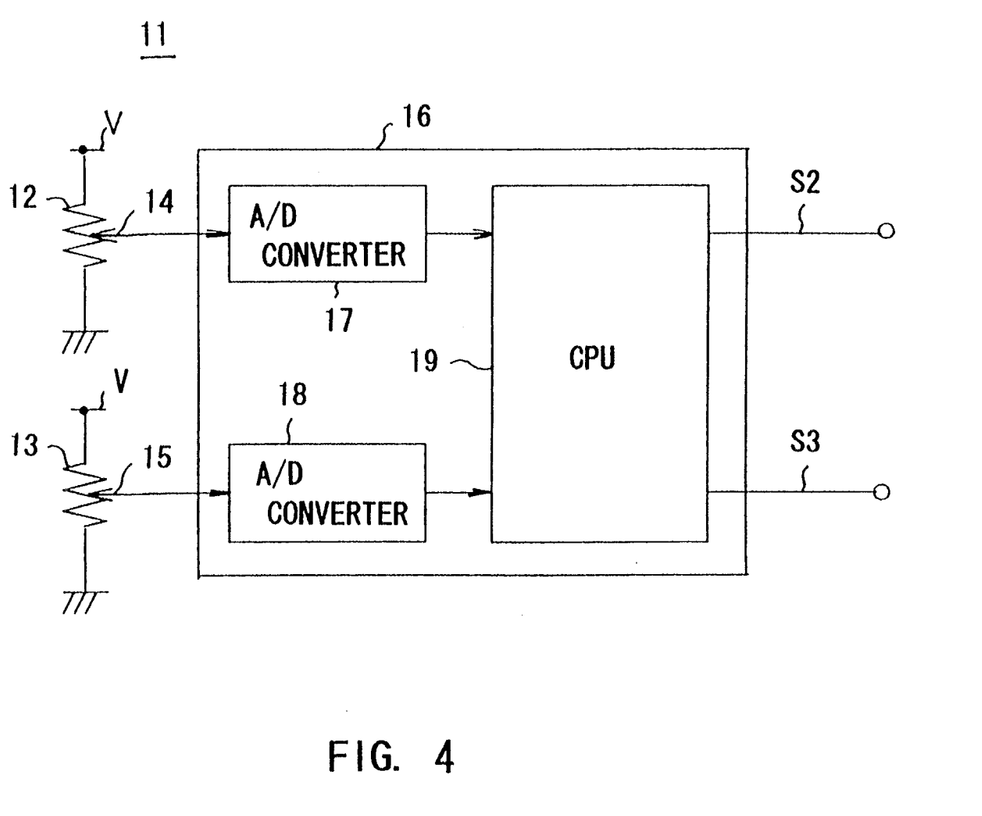
FIG. 4 is a circuit diagram, partly as a block diagram, showing the operating position detecting section.

The operating position detecting section 11 will be described in more detail. The section 11, as shown in FIG. 4, has: a resistor 12 arranged in parallel with the x-axis (FIGS. 3A and 3B), and a resistor 13 arranged in parallel with the y-axis (FIGS. 3A and 3B), the resistors being affixed to the base 6. A predetermined voltage is applied across those resistors 12 and 13. The resistors 12 and 13 are in slide contact with sliders 14 and 15, respectively, which are provided on the side of the fulcrum of the bar-shaped member 7 so as to move in association with the movement of the dimple 8A. Therefore, in the operating position detecting section 11, voltages corresponding to the operating positions in the directions of x-axis and y-axis of the dimple 8A are obtained from the sliders 14 and 15, respectively. The voltages are applied to a microcomputer 16; that is, they are applied through analog-to-digital converters 17 and 18 to a central processing unit (CPU) 19 in the microcomputer 16.

The CPU 19 uses the values of those voltages, to calculate the direction in the x-y plane in which the dimple 8A is operated, and the inclination from the z-axis.

Figure 5:
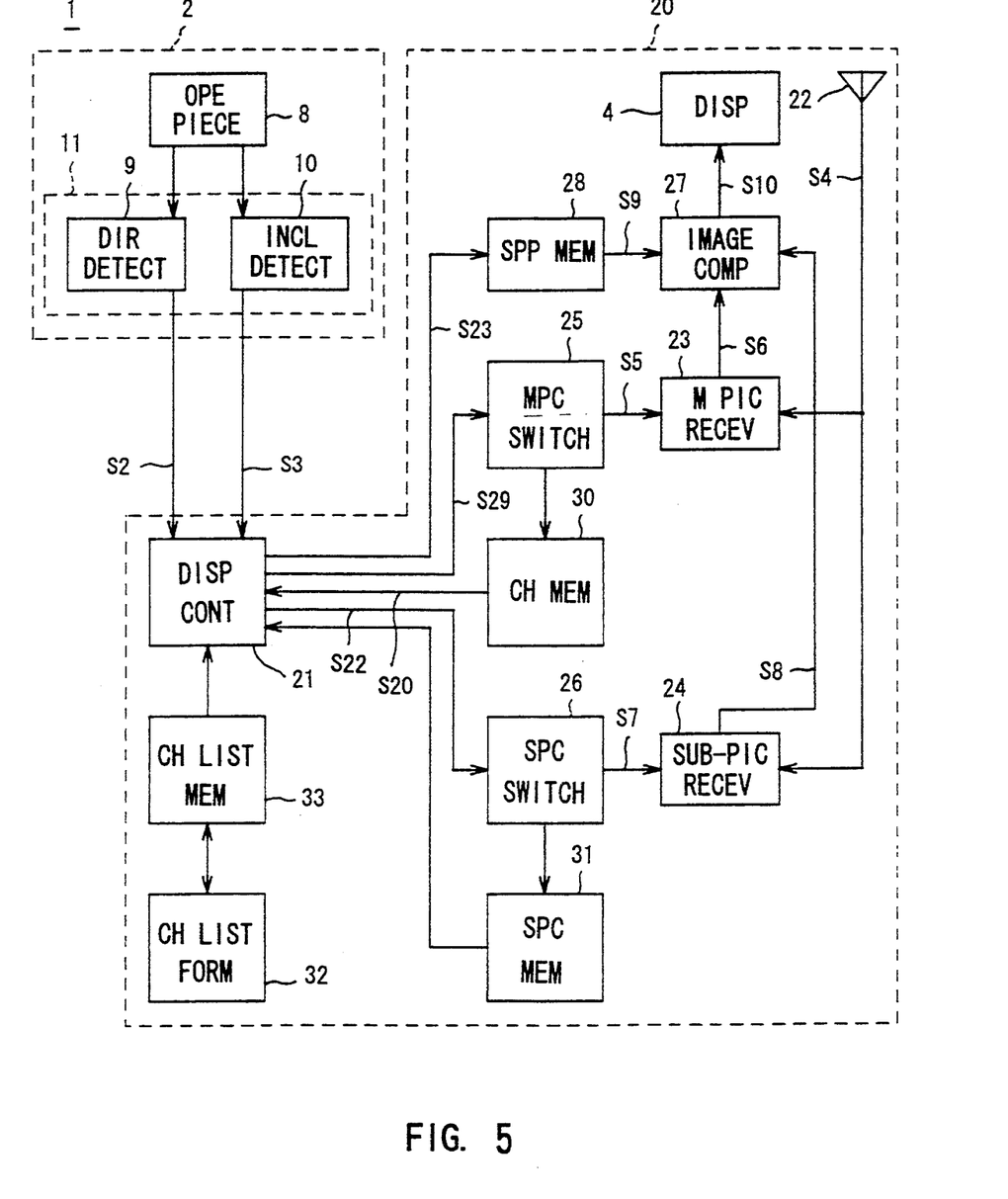
FIG. 5 is a block diagram showing the arrangement of the image display device according to the invention.

In response to this calculation, the operating position detecting section 11 applies a direction detection signal S2 and an inclination detection signal S3 to a display control section 1 in an image processing section 20 built in the television set body 3 (FIG. 1) as shown in FIG. 5.

(2) Image Display Circuit

In the image processing section 20, a television signal S4 received through an antenna 22 is applied to a main picture signal receiving circuit 23 and a sub-picture signal receiving circuit 24.

The main picture signal receiving circuit 23 applies to an image composing circuit 27 the image signal S6 of a channel which is based on a control signal S5 from a main picture channel switching circuit 25, while the sub-picture signal receiving circuit 24 applies to the image composing circuit 27 the image signal S8 of a channel which is based on a control signal S7 from a sub-picture channel switching circuit 26.

In the image composing circuit 27, the image signal S8 is superposed on the image signal S6 according to a control signal S9 provided by a sub-screen position memory section 28, to form an image signal S10, which is applied to the display section 4.

As a result, the display section 4 shows the sub-picture at the predetermined position which is selected from the plurality of sub-picture display positions stored in the sub-picture position memory section 28.

In the image processing section 20, the direction detection signal S2 outputted by the direction detecting section 9 and the inclination detection signal S3 outputted by the inclination detecting section 10 are received by a display control section 21, so that switching of the main picture channel and the sub-picture channel, and the sub-picture showing position can be controlled with the joy-stick type operating piece 8.

The display control section 21 performs a predetermined image processing operation according to the detection signals S2 and S3 while referring to a channel list which is formed by a channel list forming section 32 and stored in a channel list memory section 33.

Figure 6:
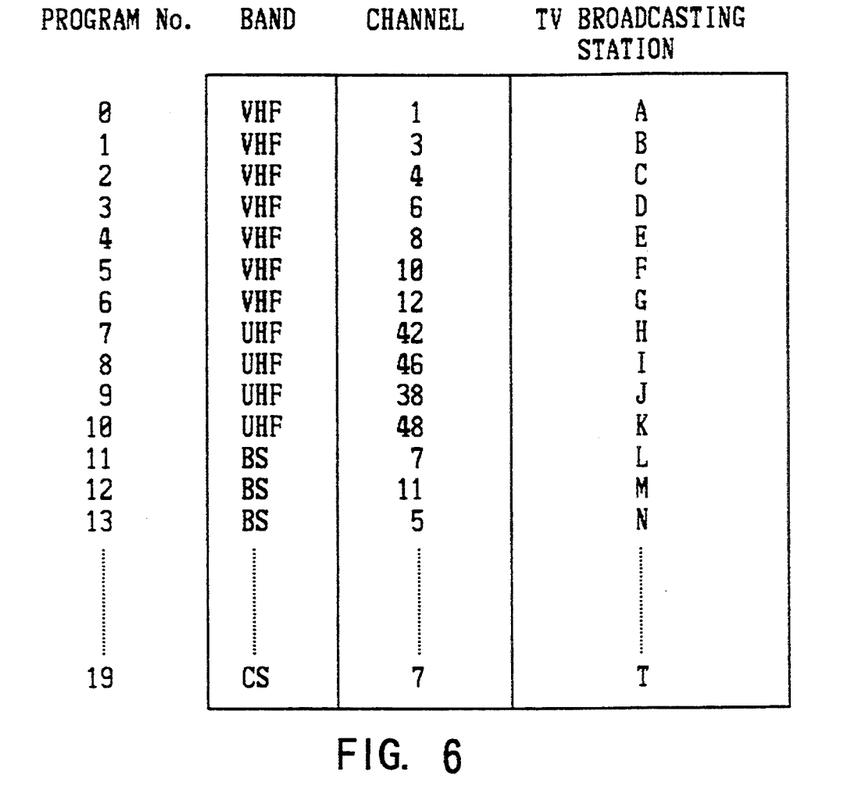
FIG. 6 is an explanatory diagram showing a channel list.

The channel list forming section 32 receives all the channels which are receivable when the television set is installed, and forms a channel list in which those channels are listed with program numbers (0 through 19 in the embodiment). The channel list thus formed is stored in the channel list memory section 33.

Figure 7:
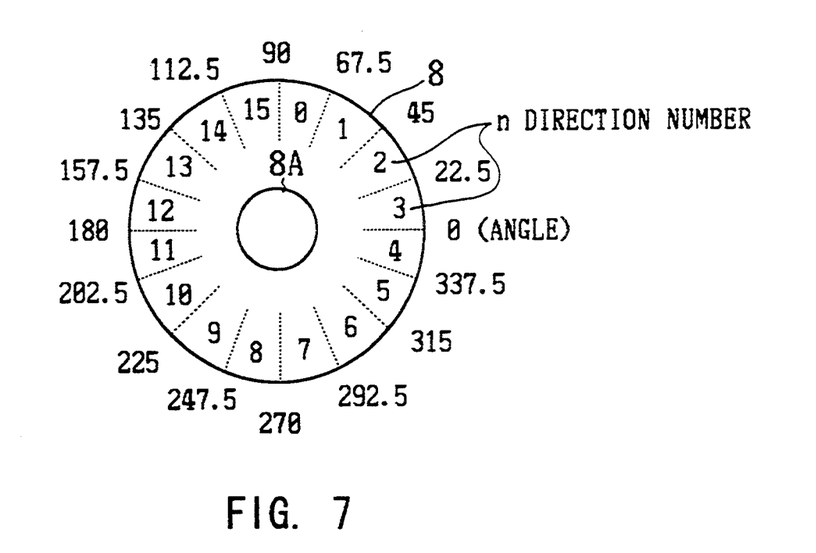
FIG. 7 is n explanatory diagram showing the directions of operation of the operating piece.

In the embodiment, the direction detecting section 9 detects the direction of inclination of the dimple 8A in units of 22. 56° as shown in FIG. 7, and outputs the detection signal S2 according to the direction thus detected. The inclination detecting section 10 outputs the detection signal S3 when the dimple 8A is inclined from the z-axis more than a predetermined angle.

Figure 8:
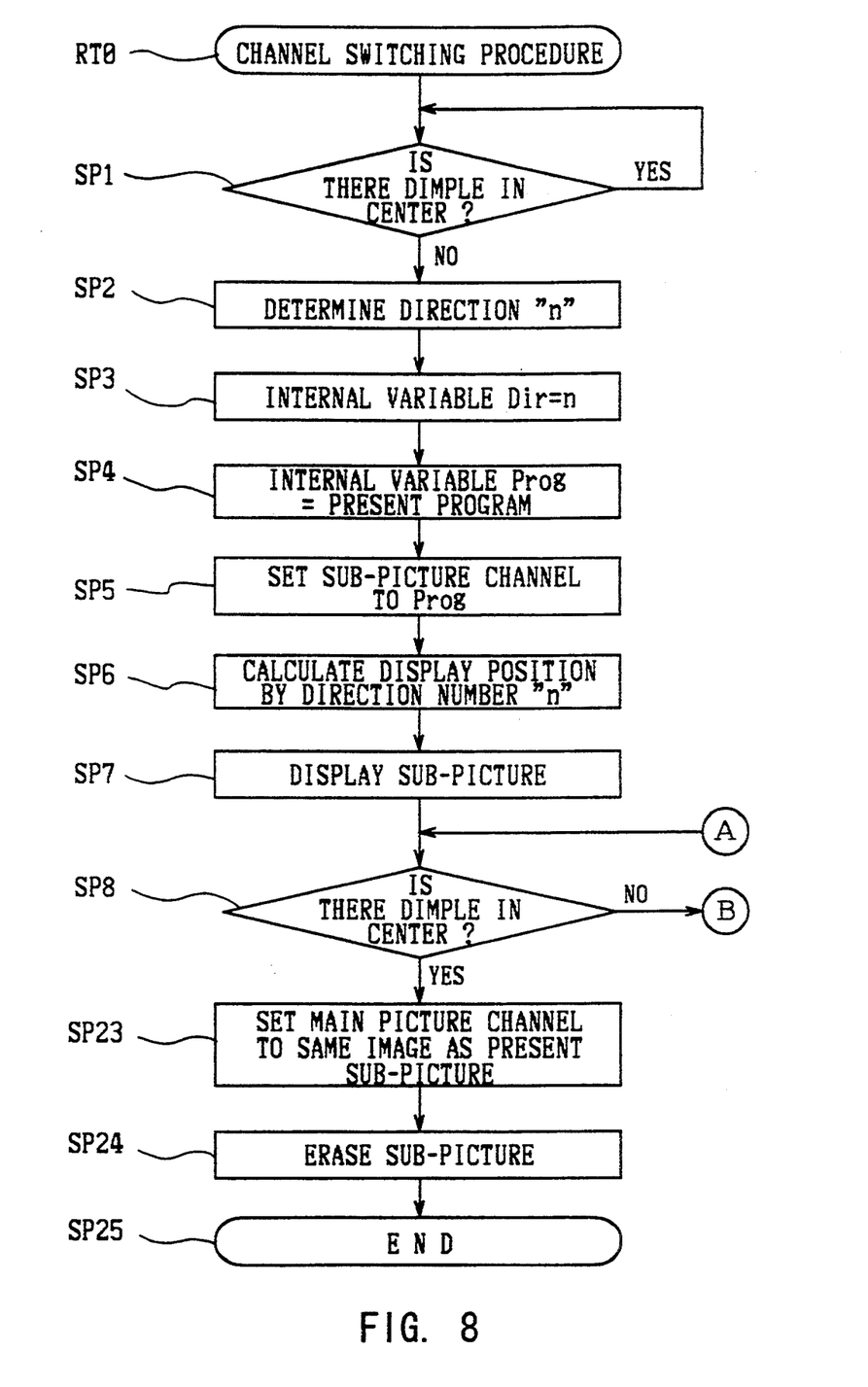
FIGS. 8 and 9 are two parts of a flow chart for a description of the operation of a display control section in the image display device.

Thus, when the operator inclines the dimple 8A of the operating piece 8 in a predetermined direction, the display control section 21 performs a channel switching procedure RTO as shown in FIG. 8, to achieve a channel switching operation.

That is, the display control section 21 operates as follows: When, in step SP1, the dimple 8A (the bar-shaped member 7) is inclined from the control position in a predetermined direction, step SP2 is executed. That is, in step SP2 the direction of inclination of the dimple 8A is determined as a direction number "n". Thereafter, in step SP3, the direction number "n" is stored as an internal variable Dir. Thus, the display control section 21 has stored the direction in which the dimple 8A has been inclined for the first time.

Next, in step SP4, the display control section 21 receives a channel data signal S20 from a channel memory section 30, and reads from the channel list memory section 33 the program number which corresponds to the channel which is displayed on the main picture at the present time, and stores it as an internal variable Prog.

In the following step SP5, the display control section 21 applies a control signal S22 to the sub-picture channel switching circuit 26, so that the sub-picture channel is set to be equal to the internal variable Prog. That is, the sub-picture channel is set to be equal to the main picture channel, and therefore the sub-picture signal receiving circuit 24 receives the same television signal S4 as the main picture signal receiving circuit 23.

In step SP6, the display control section 21 calculates the sub-picture showing position by using the direction number "n". Thereafter, in step SP7, the sub-picture is shown at the predetermined display position.

If summarized, the display control section 21 applies the control signal S23 to the sub-picture position memory section 28 according to the direction number "n", and shows the sub-picture at the position which is selected, according to the direction number "n", from the sub-picture showing positions stored in the sub-picture position memory section 28.

Figure 10A:
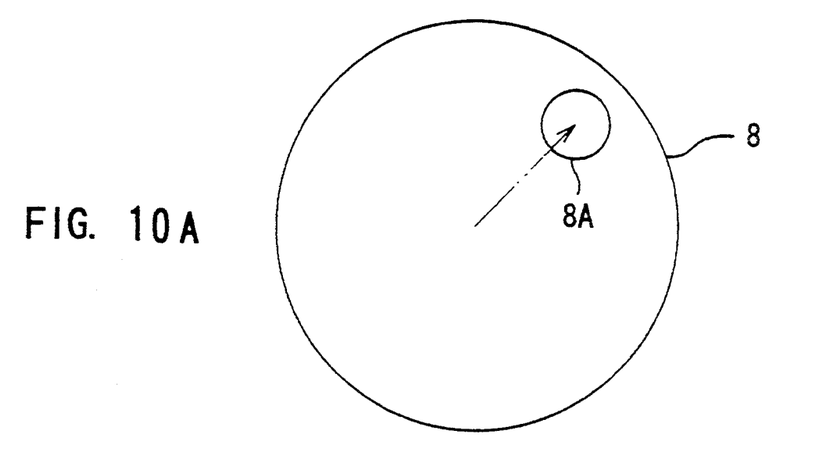
FIGS. 10A to 10C are explanatory diagrams for a description of the operation of the recess.
Figure 10B:
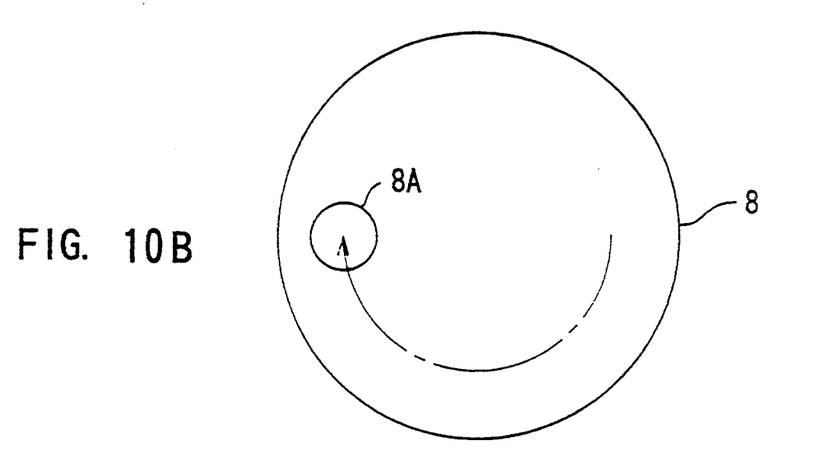
Figure 10C:
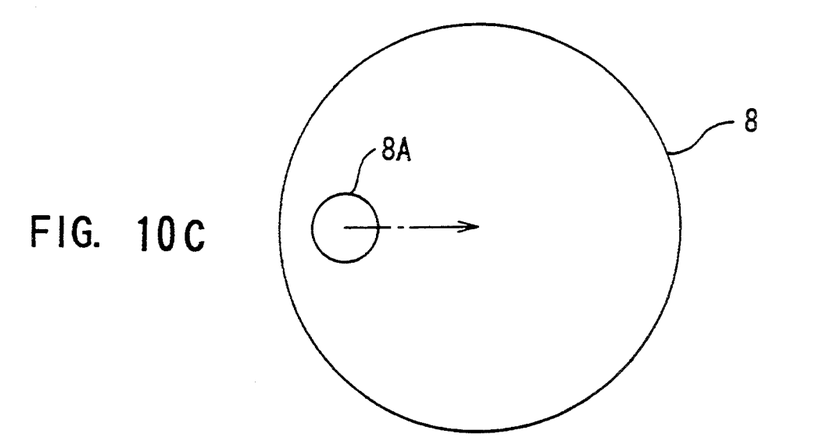
Figure 11A:
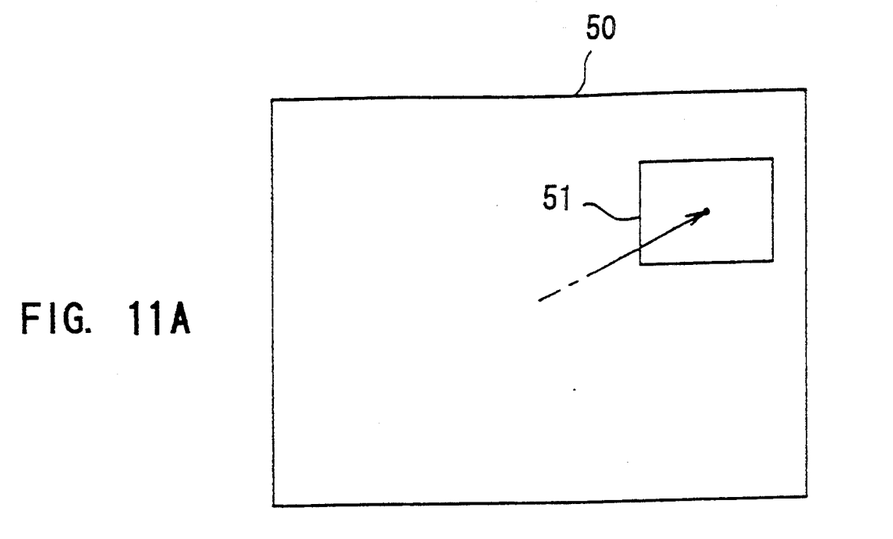
FIGS. 11A and 11B are explanatory diagrams showing the positions of a sub-screen.
Figure 11B:
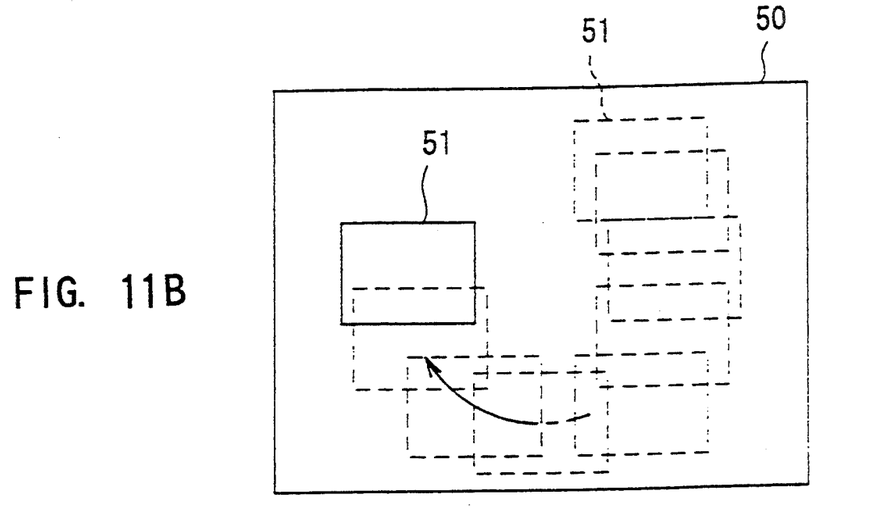

Accordingly, in the case where, as shown in FIGS. 10A to 10C, the dimple 8A is inclined upwards toward the right (or in a direction number 1 (in FIG. 7), a sub-picture 51 is shown in the upper right portion of the main picture 50 as shown in FIGS. 11A and 11B. In this case, the sub-picture 51 displays the same channel image as the main picture 50.

As is apparent from the above description, the sub-picture can be shown in the direction in which the operator has inclined the dimple 8A; that is, the sub-picture 51 can be set at a desired position.

In the following step SP8, the display control section 21 determines the desired position according to the detection signal S3 whether or not the dimple 8A is returned to the central position P.

When it is determined in step SP8 that the dimple 8A has not yet returned to the central position P it means that the operator has turned the dimple 8A in a predetermined direction "n", and step SP9 (FIG. 9) is executed. That is, the display control section 21 obtains a new direction number "n" by using the detection signal S2 provided by the direction detecting section 9.

Figure 9:
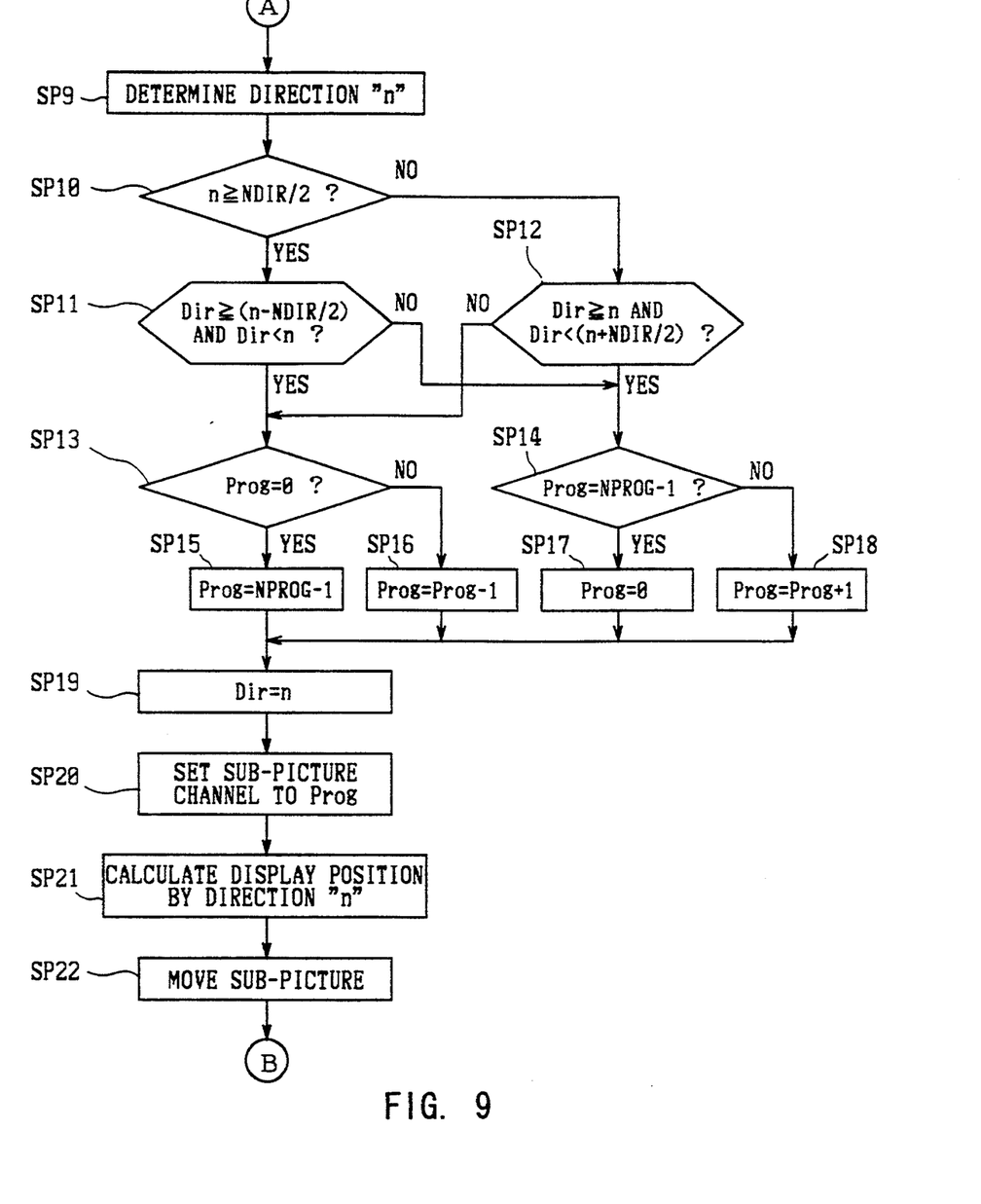

In the following step SP10, the display control section 21 determines whether or not the new direction number "n" is larger than or equal to NDIR/2 (where NDIR represents the number of all the direction numbers "n"), being sixteen (16) in the embodiment). That is, in step SP10, the display control section 21 determines whether or not the new direction number "n" is larger than or equal to eight (n=8) in the embodiment.

When, in step SP10, it is determined that the direction number "n" is larger than or equal to NDIR/2, then step SP11 is executed. When, in step SP10, it is determined that the direction number "n" is not larger than nor equal to NDIR/2; that is, it is smaller, then step SP12 is executed.

In step SP11, the display control section 21 determines whether or not the direction number "n" stored as the internal variable Dir is larger than or equal to the value obtained by subtracting NDIR/2 (=8) from the new direction number "n" and is smaller than the new direction number "n". When, in step SP11 the result of the determination is affirmative, it means that the dimple 8A is turned counterclockwise, and therefore step SP13 is executed. When, on the other hand, the result of the determination is negative, it means that the dimple 8A is turned clockwise, and therefore step SP14 is executed.

In step SP12, the display control section 21 determines whether or not the direction number "n" stored as the internal variable Dir is larger than or equal to the new direction number "n" and smaller than the sum of the new direction number "n" and NDIR/2 (=8). When, in step SP12, the result of the determination is affirmative, it means that the dimple 8A is turned clockwise, and step SP14 is executed. When, on the other hand, the result of determination is negative, it means that the dimple 8A is turned counterclockwise, and step SP13 is executed.

Thus, when the dimple 8A is turned counterclockwise, the display control section 21 determines in step SP13 whether or not the program number (FIG. 6) stored as an internal variable Prog is zero (Prog=0). When it is determined that the program number is zero (0); that is, when the result of the determination is affirmative, then step SP15 is executed; in which NPROG−1 is stored as a new internal variable Prog, where NPROG is the number of all the program numbers (twenty (NPROG=20) in the embodiment). Therefore, in step SP15, the display control section 21 stores the program number "19" as a new internal variable Prog. When, on the other hand, the result of the determination is negative, step SP16 is executed. In step SP16, the display control section 21 performs an operation of Prog=Prog−1 with respect to the internal variable Prog, to decrease the latter Prog.

When the dimple 8A is turned clockwise, in step SP14 the display control section 21 determines whether or not the program number stored as the internal variable Prog is equal to NPROG−1 (in the embodiment, NPROG−1=19 because NPROG is twenty (NPROG=20)). When the result of the determination is affirmative; that is, when it is determined that the program number is equal to NPROG−1, then step SP17 is executed. That is, in step SP17, the program number "0" is stored as a new internal variable Prog. When, on the other hand, the result of determination is negative, then step SP18 is executed, in which the display control section 21 performs an operation of Prog=Prog+1 with respect to the internal variable Prog, to increase the latter Prog.

Thus, when the dimple 8A is turned counterclockwise, the display control section 21 stores a program number which is smaller by one than the program number stored before. If, in this case, the program number stored before is the top number, the last program number is stored.

When, on the other hand, the dimple 8A is turned clockwise, the display control section 21 stores a program number which is larger by one than the program number stored before. If in this case, the program number stored before is the last program number, the top program number stored before is the last program number, the top program number is stored.

Thereafter, step SP19 is executed, in which the display control section 21 stores a new direction number "n" as the internal variable Dir. In step SP20, the display control section 21 applies the control signal S22 to the sub-picture channel switching circuit 26, so that the sub-picture channel is switched over to the number corresponding to the new internal variable Prog.

Thereafter, in step SP21, the display control section 21 calculates the display position of the sub-picture 51 (FIGS. 11A and 11B) according to the direction "n" in which the dimple 8A is turned; and in step SP22 the display control section 21 applies the control signal S23 to the sub-picture position memory section 28, to move the sub-picture 51 to the position corresponding to the direction "n".

After the sub-picture channel switching operation and the sub-picture showing position setting operation have been accomplished in the above-described manner, step SP8 is executed. In step SP8, the display control section 21 performs again the sub-picture channel switching operation and the sub-picture showing position setting operation according to the position of the dimple 8A thus turned.

When, in step SP8, the result of determination is affirmative, then it means that the operator has found the desired channel image on the sub-picture. Then, step SP23 is effected. That is, in step 23, the display control section 21 applies the control signal S29 to the main picture channel switching circuit 25, so that the channel of the main picture 50 is set to the channel of the sub-picture 51, and the main picture displays the same image as the sub-picture 51.

Next, in step SP24, the display control section 21 erases the sub-picture 51. Thereafter, in step SP25, the channel switching procedure is ended.

(3) Operation of the Embodiment

In the image display device thus constructed, the preferred image display processing section 20 operates to show the sub-picture 51 at the predetermined position on the main picture 50 according to the inclination $\theta$ of the dimple 8A from the z-axis and the direction of operation "n" thereof in the x-y coordinate system.

More specifically, the image display processing section 20 operates to show the sub-picture 51 at the position which corresponds to the direction of inclination of the dimple 8A, and display the same image on the sub-picture 51 as is displayed on the main picture.

When the dimple 8A is turned clockwise, the sub-picture 51 shown is moved clockwise; that is, the sub-picture 51 is gradually moved in accordance with the movement of the dimple 8A, while the images of different channels are successively displayed on the sub-picture 51 in accordance with the angles of rotation of the dimple 8A around the z-axis.

When the dimple 8A is turned counterclockwise, the sub-picture 51 shown in also moved counterclockwise, while, in accordance with the angles of rotation of the dimple 8A around the z-axis, the images of different channels displayed in the case where the dimple 8A is turned clockwise are displayed on the sub-picture 51 in the reverse order.

When the operator releases the dimple 8A after the desired channel image is displayed on the sub-picture 51, the dimple 8A is returned to the central position P (FIGS. 3A and 3B), and the desired channel image displayed on the sub-picture 51 is displayed on the main picture 50.

Thus, the sub-picture 51 is shown in the main picture 50 describing the locus which is equivalent to the locus of the finger set on the operating piece 8.

(4) Effects of the Embodiment

In the preferred image display device constructed as described above, the joy stick type operating piece 8 is employed, and the sub-picture 51 is shown in at the position corresponding to the direction of operation of the operating piece 8, and different channel images are successively displayed on the sub-picture 51 as the operating piece 8 turns. This technique, eliminating the difficulty that a desired channel cannot be selected without troublesome operations, allows the operator to select a desired channel intuitively. Thus, the image display device of the invention can be operated with ease.

With the image display device, the channels are selected one after another according to the relative angles of rotation of the operating piece 8. This eliminates the difficulty that would exist if the number of channels which could be selected with the operating piece 8 is limited. Thus, an image display device can be constructed according to the invention which can be effectively used in the age of multi-channel television.

In the image display device, a desired channel is selected with the joy stick type operating piece 8, which makes it possible to miniaturize the remote controller 2. The resultant remote controller 2 is greatly improved in ease of use.

(5) Other Embodiments

In the above-described embodiment, sixteen directions are provided in the x-y plane in which the dimple 8A is moved, and the direction of operation of the dimple 8A is determined according to the sixteen directions, to select a channel and to move the sub-picture; however, the invention is not limited thereto or thereby. That is, the embodiment may be so modified that the dimple 8A is moved in more than or less than sixteen directions in the x-y plane.

Furthermore, in the above-described embodiment, the substantially spherical operating piece 8 is connected to the free end of the joy stick type controller 5, so that the latter 5 can be readily operated with the finger; however, the invention is not limited thereto or thereby. For instance, the operating piece connected to the free end of the controller 5 may be changed in configuration. Furthermore, the operating piece may be omitted as the case may be; that is, the same effects can be obtained even when the bar-shaped member 7 is operated directly.

In addition, in the above-described embodiment, twenty (20) channels are stored in the channel list memory section 33; however, the invention is not limited thereto or thereby. That is, the number of channels to be stored can be changed when necessary.

The above-described embodiment operates as follows: When the operating piece 8 is moved in a predetermined direction, the channel image displayed on the main picture 50 at that time instant is displayed on the sub-picture. When, under this condition, the operating piece 8 is turned clockwise or counterclockwise, different channel images are displayed successively on the sub-picture 51 according to the relative angles of rotation of the operating piece around the z-axis, until the desired channel image is found. However, the invention is not limited thereto or thereby. That is, the device may be so modified that the channels are assigned to the directions "n" of operation of the operating piece 8, respectively, so that a desired channel is obtained according to the absolute direction of operation of the operating piece 8. With the modification, the operator can select the desired channel directly.

Furthermore, in the above-described embodiment, in addition to the main picture signal receiving circuit 23, the sub-picture signal receiving circuit 24 is provided to display the channel images on the sub-picture 51 thereby to detect the desired channel image. However, the present invention is not limited to this and the embodiment may be so modified that the image on the main picture 50 is directly switched in response to the operation of the operating piece 8, thereby selected the desired channel image. In this case, the sub-picture signal receiving circuit 24 may be eliminated.

Figure 12A:
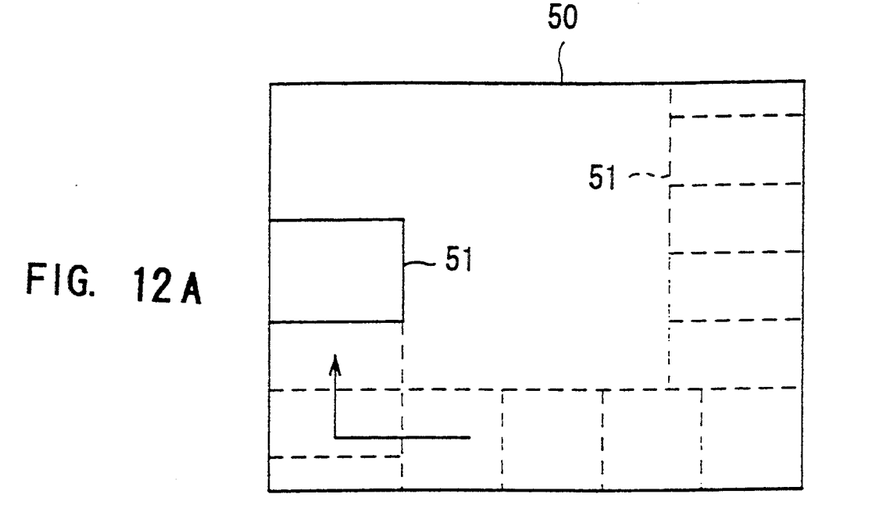
FIGS. 12A to 12C are explanatory diagrams showing other examples of the positions of the sub-screen.
Figure 12B:
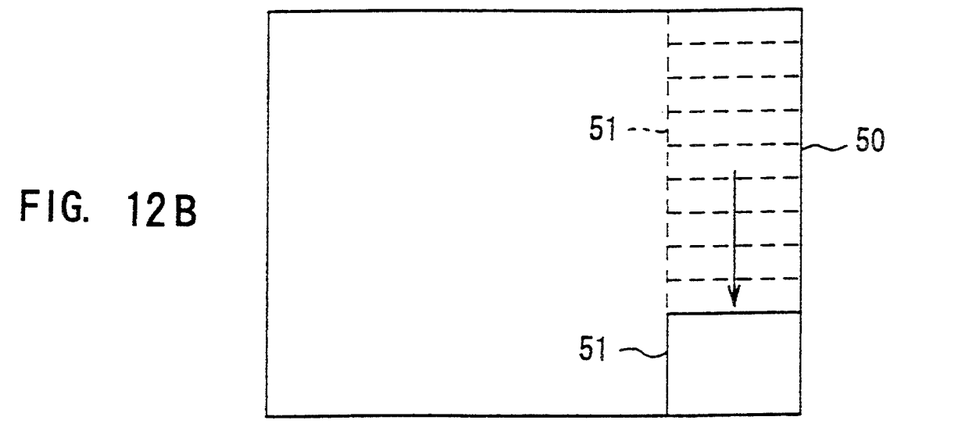
Figure 12C:
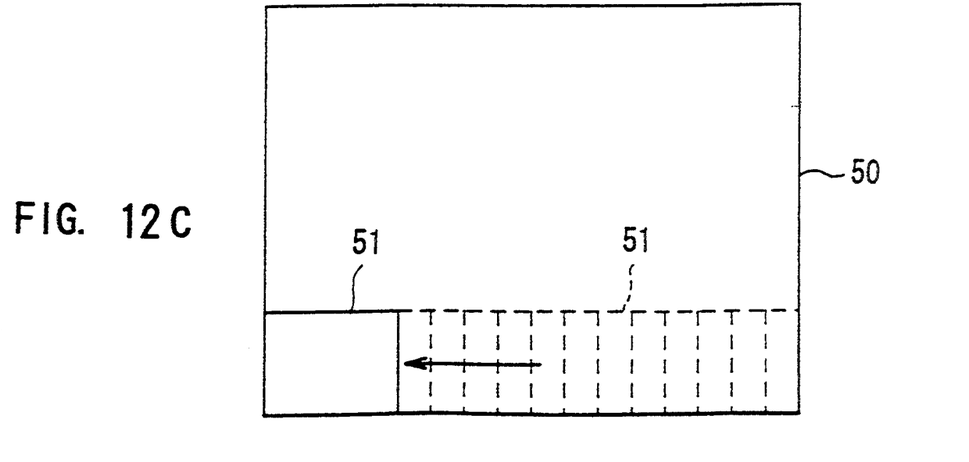

In addition, in the above-described embodiment, as shown in FIGS. 11A and 11B the sub-picture 51 is moved along a circular locus as the operating piece 8 is turned. However, the present invention is not limited to this but, that is, the embodiment may be so modified that, as shown in FIGS. 12A to 12C, the sub-picture 51 is gradually moved along the periphery of the main picture 50 or vertically or horizontally, or that the sub-picture 51 is set at a fixed position. In those modifications, the sub-picture showing position stored in the sub-picture position memory section 28 should be set to a desired position.

Furthermore, in the above-described embodiment, the operating piece 8 is provided in the remote controller 2. However, the present invention is not limited to this and the technical concept of the invention may be applied to the case where the operating piece 8 is provided on the front of the television set.

Moreover, the above-described embodiment concerns the image display device for the television set 1. However, the present invention is not limited to this and the technical concept of the invention is applicable, for instance, to a television set provided in a video tape recorder.

In the above-described embodiment, the operating piece 8 is employed as channel selecting means for selecting a desired channel from the group of channels of the television set 1. However, the present invention is not limited to this and the operating piece 8 may be employed for setting various modes or adjusting sound volume with the same effects.

The invention may be embodied in other specific forms without departing from the spirit or essential characteristics thereof. The present embodiment is therefore to be considered in all respects as illustrative and no restrictive, the scope of the invention being indicated by the appended claims rather than by foregoing description and all changes which come within the meaning and range of equivalency of the claims are therefore intended to be embraced therein.

What is claimed is:

1. A device for controlling the display of an image on a display screen, comprising:
   a remote controller body;
   an operating member mounted in said body and including a bar-member set on one end at an origin defined as the intersection of the x-axis and the y-axis of an x-y plane, said operating member being held in an upright position along the z-axis extended from said origin in such a manner as to be perpendicular to said x-y plane and being movable from said upright position in a range of predetermined angles with respect to the z-axis;
   operating position detecting means for detecting amounts of displacement of said operating member in the directions of the x-axis, y-axis and z-axis respectively, from said upright position; and
   selecting means for selecting, according to said detected displacement amounts provided by said operating position detecting means, the image to display on the display screen from among a plurality of reproducible images.

2. A device for controlling the display of an image on a display screen according to claim 1, wherein means for transmitting a predetermined control signal by wire or wireless signal transmission are provided on said remote controller body.

3. A device for controlling the display of an image on a display screen according to claim 2, wherein said operating member has a recess which is touched with a finger tip of a user, for indicating to the user a direction in which said operating member is operated.

4. A device for controlling the display of an image on a display screen according to claim 1, further comprising:
   variable position display means for displaying the image selected by said selecting means on the display screen at a position determined from said detected displacement amounts provided by said operating position detecting means.

5. A device for controlling the display of an image on a display screen comprising:
   a remote controller body:
   an operating member mounted in said body and including a bar-shaped member set on one end at an origin defined as the intersection of the x-axis and the y-axis of an x-y plane, said operating member being held upright along the z-axis extended from said origin in such a manner as to be perpendicular to said x-y plane in an upright position, and being swingable from the upright position where said operating member is held upright to rotated positions in a range of predetermined angles with respect to the z-axis;
   operating position detecting means for detecting amounts of displacement of said operating member from said upright position, where said operating member is held upright, respectively, in the directions of the x-axis, y-axis and z-axis;
   selecting means for selecting according to the results of detection provided by said operating position detecting means, the image which is to be displayed on the display screen from among a plurality of reproducible images; and
   television signal receiving circuits for reproducing an image of a receive channel selected by said selecting means from among a plurality of television broadcasting channels, the image of the selected receive channel being displayed as the image on the display screen.

6. A device for controlling the display of an image on a display screen according to claim 5, wherein said selecting means specifies said receive channel according to a relative angle of rotation of said operating member around the z-axis.

7. A device for controlling the display of an image on a display screen according to claim 5, wherein said selecting means specifies said receive channel according to an absolute direction of operation of said operating member.

8. A device for controlling the display of an image on a display screen according to claim 5, wherein said selecting means operates to contract the reproduced image of said receive channel thus specified, and to display said contracted image as the image on a sub-picture in the display screen.

9. A device for controlling the display of an image on a display screen comprising:
   a remote controller body;
   an operating member mounted said body and including a bar-shaped member set on one end at an origin defined as the intersection of the x-axis and the y-axis of an x-y plane, said operating member being held upright along the z-axis extended from said origin in such a manner as to be perpendicular to said x-y plane in an upright position, and being swingable from the upright position where said operating member is held upright to rotated positions in a range of predetermined angles with respect to the z-axis;
   operating position detecting means for detecting amounts of displacement of said operating member from said upright position, where said operating member is held upright, respectively, in the directions of the x-axis, y-axis and z-axis;
   selecting means for selecting, according to the results of detection provided by said operating position detecting means, the image which is to be displayed on the display screen from among a plurality of reproducible images;
   a first television signal receiving circuit for displaying an image of a first receive channel which has been selected from among a plurality of television broadcasting channels, on a main picture in the display screen; and
   a second television signal receiving circuit for contracting an image of a second receive channel specified by said selecting means, and displaying said contracted image on a sub-picture in the display screen in an image superposition mode.

* * * * *

UNITED STATES PATENT AND TRADEMARK OFFICE
CERTIFICATE OF CORRECTION

PATENT NO. : 5,428,406
DATED : June 27, 1995
INVENTOR(S) : Hideo Terasawa It is certified that error appears in the above-identified patent and that said Letters Patent is hereby corrected as shown below:

```
Col. 1, line  7, delete "is" second occurrence
        line 20, change "is the" to --are--
Col. 4, line 51, delete "outer end"
Col. 5, line  4, change "8" to --θ--
Col. 6, line 12, change "22.56°" to --22.5°--
Col. 7, line  6, after "P" insert --,--
        line 55, change ";" to --,--
Col. 8, line 50, delete "then"
        line 62, after "the" insert --Preferred--
        line 64, delete "preferred"
Col. 9, line 30, after "the" insert --Preferred--
        line 31, delete "preferred"
```

In the claims:

```
Col. 11, line 29, after "z-axis" second occurrence, insert --,--
Col. 12, line  6, after "selecting" second occurrence, insert --,--
         line 36, after "mounted" insert --in--
```

Signed and Sealed this

Tenth Day of September, 1996

Attest:

BRUCE LEHMAN

*Attesting Officer*         Commissioner of Patents and Trademarks